US007483966B2

(12) United States Patent
Cromer et al.

(10) Patent No.: US 7,483,966 B2
(45) Date of Patent: Jan. 27, 2009

(54) SYSTEMS, METHODS, AND MEDIA FOR REMOTE WAKE-UP AND MANAGEMENT OF SYSTEMS IN A NETWORK

(75) Inventors: Daryl Carvis Cromer, Apex, NC (US); Howard Jeffrey Locker, Cary, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/749,257

(22) Filed: Dec. 31, 2003

(65) Prior Publication Data

US 2005/0160162 A1 Jul. 21, 2005

(51) Int. Cl.
*G06F 15/173* (2006.01)
(52) U.S. Cl. .................. 709/223; 709/220; 709/222; 709/224; 713/300; 713/310
(58) Field of Classification Search ............... 713/300, 713/310; 709/220–224, 227
See application file for complete search history.

(56) References Cited

U.S. PATENT DOCUMENTS

| 6,393,570 B1* | 5/2002 | Henderson et al. ......... 713/310 |
| 6,421,782 B1* | 7/2002 | Yanagisawa et al. .......... 726/4 |
| 6,427,182 B1* | 7/2002 | Sugiura et al. ............. 710/303 |
| 6,438,640 B1* | 8/2002 | Miyamoto et al. .......... 710/303 |
| 2002/0004912 A1* | 1/2002 | Fung ....................... 713/300 |
| 2002/0135611 A1* | 9/2002 | Deosaran et al. ........... 345/738 |
| 2002/0194512 A1 | 12/2002 | Weng et al. |
| 2004/0163008 A1* | 8/2004 | Kim ............................. 714/4 |
| 2005/0177755 A1* | 8/2005 | Fung ....................... 713/300 |

OTHER PUBLICATIONS

Dylan Mc Namee, et al., Specialization Tools and Techniques for Systematic Optimization of System Software, ACM Transactions on Computer Systems, vol. 19, No. 2, May 2001, pp. 217-251.
David R. Cheriton, The V Distributed System, Communicatiosn of the ACM, Mar. 1988, vol. 31, No. 3, pp. 314-333.

* cited by examiner

*Primary Examiner*—Jeffrey Pwu
*Assistant Examiner*—Willow Noonan
(74) *Attorney, Agent, or Firm*—Jason O. Piche; Schubert Osterrieder & Nickelson PLLC

(57) ABSTRACT

Systems, methods, and media for providing remote wake-up and management of systems in a network are disclosed. More particularly, hardware and/or software for a server to receive feedback from a client as to the status of its wake-on-LAN functionality is disclosed. Embodiments include hardware and/or software for determining a client to be managed, determining whether the client is active on the network, transmitting a first network packet comprising a wake-on-LAN packet, and receiving a return wake-on-LAN packet, which comprises an indication of the address of the client and an indication of the status of the wake-on-LAN functionality of the client. Embodiments may also include transmitting a command to start a management session on the client.

16 Claims, 9 Drawing Sheets

800

| 802 | 804 | 806 | 808 | 810 |

| Clients to Manage | On Network | WOL Status | Client Able to be Managed | Update Status |
|---|---|---|---|---|
|  | Yes/No | Enable/Disable | Yes/No | Yes/No/In Progress |
| 1 |  |  |  |  |
| 2 |  |  |  |  |
| 3 |  |  |  |  |
| n |  |  |  |  |

FIG 8

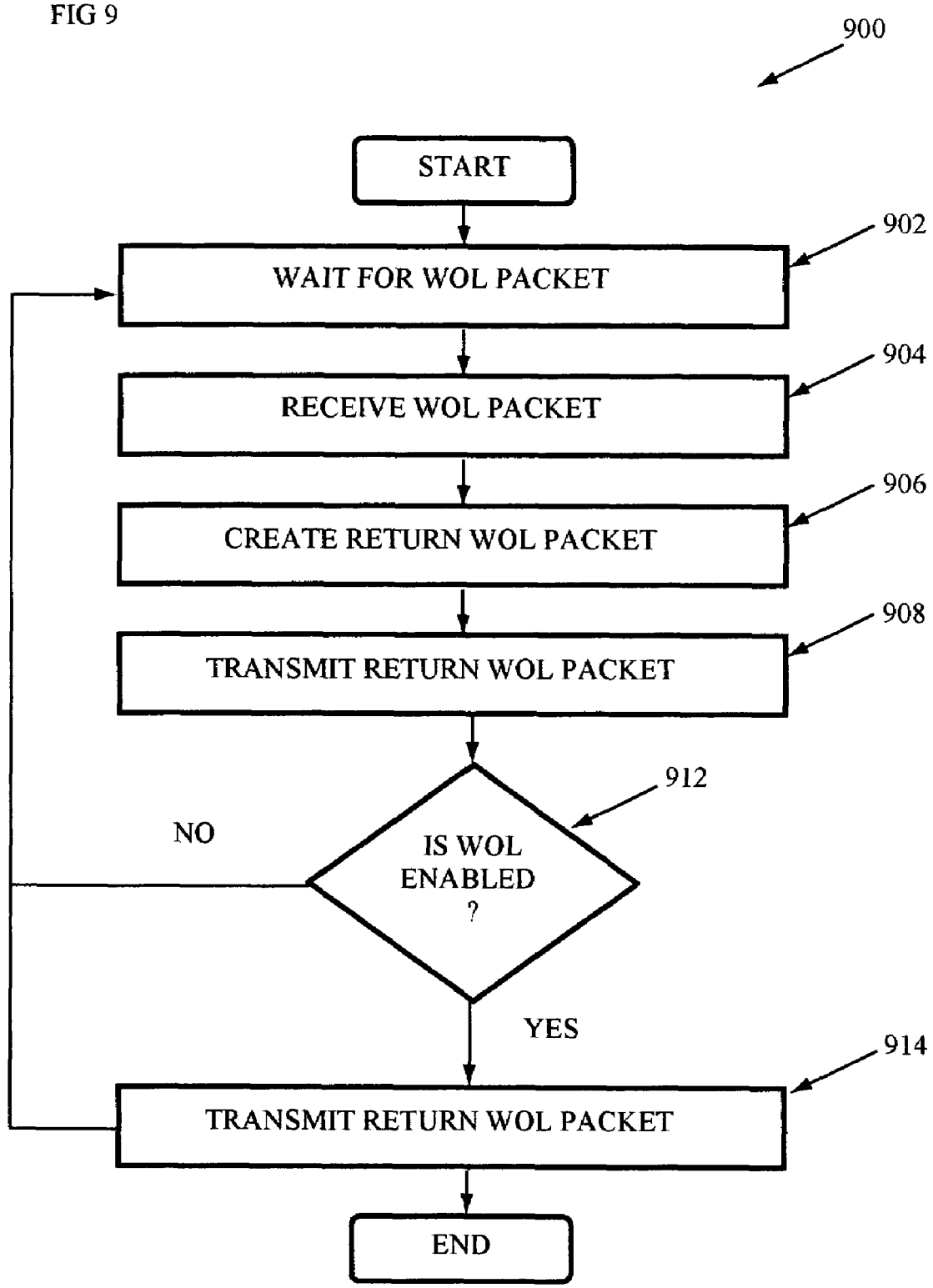

SYSTEMS, METHODS, AND MEDIA FOR REMOTE WAKE-UP AND MANAGEMENT OF SYSTEMS IN A NETWORK

FIELD OF INVENTION

The present invention is in the field of data processing systems and, in particular, a data processing system and method for remote wake-up and management of systems in a network. More particularly, the present invention relates to systems, methods, and media comprising a server and client computer systems coupled by a network for transmitting and receiving wake-up commands and status between the server computer system and the client computer systems and for management of the client computer systems by the server computer system.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

One known method for managing a networked system is the ability of a computer system to cause an initially powered-off client computer system on the network to power-up. This method is commonly called "Wake-on-LAN," and may also be known as remote wake-up. This method permits a server, or any other computer system on the network, to cause a client on the network to power-up by transmitting a Wake-on-LAN packet with the appropriate information.

By utilizing Wake-on-LAN, system administrators can more efficiently manage a client-server system by performing automated software applications such as software downloads, upgrades, maintenance, back-ups, virus scans, etc. during times when end-users are gone and when off-peak loads exist on the network. Wake-on-LAN provides more efficiency for end-users as software maintenance and operations can be performed while they are gone, eliminating delays and reboots. Systems administrators save time with Wake-on-LAN as well by avoiding having to manually turn computers on and off to perform software maintenance, upgrades, etc. Network operations are also improved as bandwidth-hungry applications such as upgrades can be performed when network activity is at a minimum. Network administrators could keep a little used computer in a powered-down state in a remote location, and could use Wake-on-LAN to wake it when needed.

In order to utilize Wake-on-LAN, a server transmits a data packet to a computer over a network. The data packet contains information identifying it as a Wake-on-LAN command, as well as authentication information. When a computer equipped with Wake-on-LAN functionality receives the data packet, it will attempt to turn on. If the computer does turn on, the server will typically be able to detect the now active computer on the network. One problem with Wake-on-LAN is that if a server does not detect the computer after the data packet has been transmitted and the server has waited long enough for the computer to initialize, the server does not know what happened. Accordingly, the server will keep on transmitting Wake-on-LAN data packets until the computer awakes. The client computer could be broken, physically off the network, "hung up," etc., and the server will have no idea what is causing the problem. Repeated attempts to wake-up a computer by the server results in inefficiencies in processing, transmission, optimization, etc.

Another problem with Wake-on-LAN is that a client computer may have Wake-on-LAN disabled. This may result in repeated attempts by the server to wake the client without any hope of succeeding.

Inefficiencies because of the lack of client knowledge by the server or by client configurations (such as Wake-on-LAN being disabled) are exacerbated when a server must manage a large number of clients. If, for example, a server must download an operating system upgrade to fifty computers during the night, time wasted trying to turn on clients that are not going to turn on will make the task more difficult to accomplish. Moreover, greater knowledge and control of the client computer systems could allow the server to optimize management of the clients and networks.

SUMMARY OF THE INVENTION

The problems identified above are in large part addressed by methods, systems, and media for remote wake-up and management of systems in a network. One embodiment provides a method for managing a remote client on a network. The method generally comprises determining a client to be managed; determining whether the client is active on the network; transmitting a first network packet using the network, the first network packet comprising a wake-on-LAN packet; and receiving a return wake-on-LAN packet, the return wake-on-LAN packet comprising an indication of the address of the client and an indication of the status of the wake-on-LAN functionality of the client.

Another embodiment provides a data processing system for managing a remote client on a network, the system comprising a server computer in communication with at least one client computer system, the server computer system comprising a processor capable of determining whether the client computer system is active; wherein the server computer system is capable of transmitting a first network packet comprising a wake-on-LAN packet; wherein the server computer system is capable of receiving a return wake-on-LAN packet, the return wake-on-LAN packet comprising an indication of the address of the client and an indication of the status of the wake-on-LAN functionality of the client; and a database comprising an indication of one or more clients and the status of their wake-on-LAN functionality.

A further embodiment provides a machine-accessible medium containing instructions, which when executed by a machine, cause said machine to perform operations. The operations can involve determining a client to be managed; determining whether the client is active on the network; transmitting a first network packet using the network, the first network packet comprising a wake-on-LAN packet; and receiving a return wake-on-LAN packet, the return wake-on-LAN packet comprising an indication of the address of the client and an indication of the status of the wake-on-LAN functionality of the client.

One embodiment provides a computer-readable medium containing a data structure for use by a data processing system on a network. The data structure generally comprises an indication of an address of a server computer system, an indication of an address for a client computer system, a synchronization stream; and an indication of the status of wake-on-LAN functionality for the client computer system.

One embodiment provides a method for managing a remote client on a network. The method generally involves receiving from a server a first network packet, the first network packet comprising a wake-on-LAN packet; creating a return wake-on-LAN packet comprising an indication of the address of the client and an indication of the status of the wake-on-LAN functionality of the client; and transmitting the return wake-on-LAN packet over the network.

BRIEF DESCRIPTION OF THE DRAWINGS

Other objects and advantages of the invention will become apparent upon reading the following detailed description and upon reference to the accompanying drawings in which like references may indicate similar elements:

FIG. 8 depicts a table for managing a plurality of clients according to one embodiment; and FIG. 9 depicts a flowchart for receiving a wake-on-LAN command and creating a return wake-on-LAN packet according to one embodiment.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for providing remote wake-up and management of systems in a network are disclosed. More particularly, hardware and/or software for a server to receive feedback from a client as to the status of its wake-on-LAN functionality is disclosed. Embodiments include hardware and/or software for determining a client to be managed, determining whether the client is active on the network, transmitting a first network packet comprising a wake-on-LAN packet, and receiving a return wake-on-LAN packet, which comprises an indication of the address of the client and an indication of the status of the wake-on-LAN functionality of the client. Embodiments may also include transmitting a command to start a management session on the client.

Figure 1:
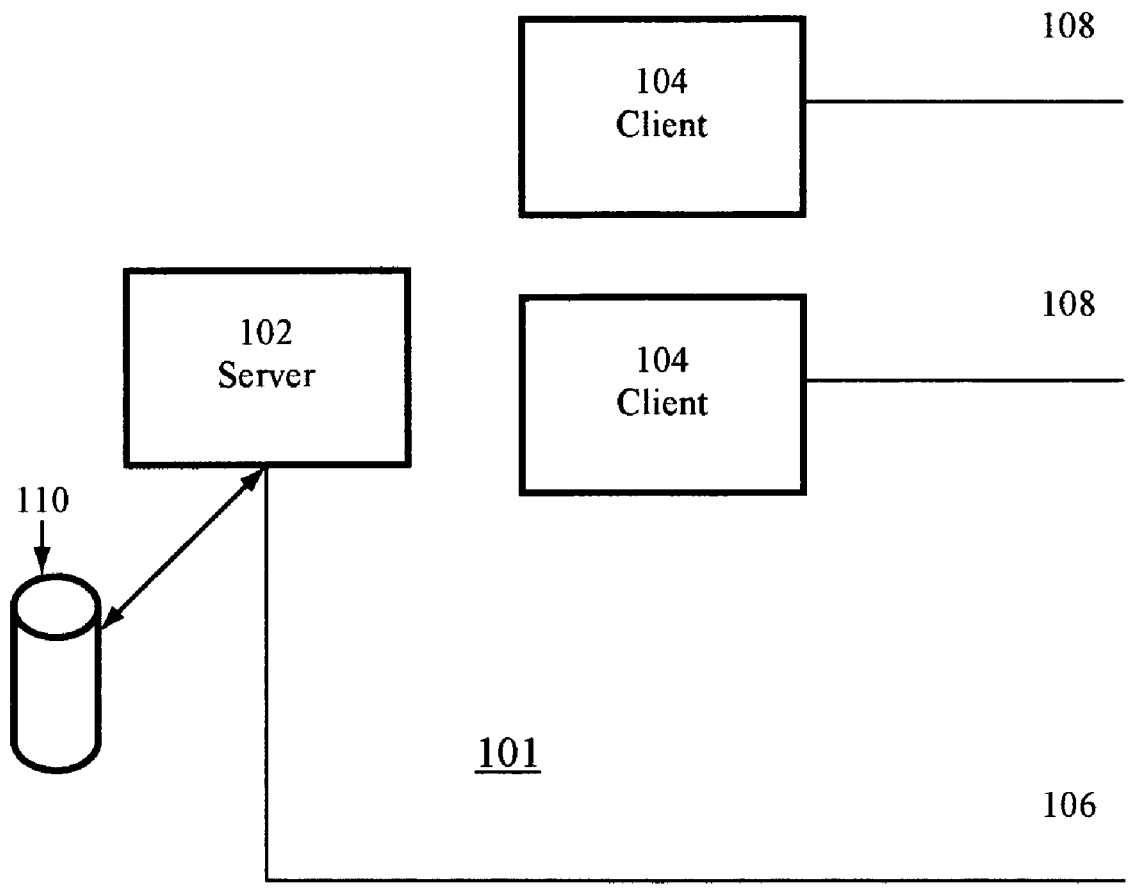
FIG. 1 depicts an environment for a system for remote wake-up and management of a client computer by a server computer according to one embodiment.

Turning now to the drawings, FIG. 1 depicts one embodiment of a data processing system 101 for providing wake-up and management of client computers according to one embodiment. System 101 includes a server computer system 102 ("server") coupled to one or more remote client computer systems 104 ("clients"). The clients may be equipped with Wake-on-LAN ("WOL") capability, which provides them with the ability to be "asleep" in a low-power state while also providing the ability to be "woken up", or returned to a full power state, when a WOL-equipped network card receives the appropriate WOL command. WOL is also sometimes known as remote wake-up or Magic Packet technology. In system 101, the server 102 and client 104 may be located at the same location, such as in the same building or computer lab, or could be geographically separated. While the term "remote" is used with reference to the distance between the server 102 and client 104, the term is used in the sense of indicating separation of some sort, rather than in the sense of indicating a large physical distance between the systems. In fact, the server 102 and client 104 may be physically adjacent in some network arrangements.

System 101 may also include a WOL database server 110 in communication with server 102. WOL database server 110 may comprise indications relating to one or more clients 104, as described in more detail in relation to FIG. 8. In one embodiment, WOL database server 110 stores an indication relating to whether a particular client 104 has WOL enabled or disabled.

In one embodiment, server 102 is connected to a hub (not shown) utilizing a local area network (LAN) connector bus 106. In this embodiment, one or more clients 104 also connect to the hub through respective LAN busses 108. The preferred form of the network conforms to the Ethernet specification and uses such hubs. It will be appreciated, however, that other forms of networks, such as token ring, may be utilized to implement the invention.

The server 102 and one or more clients 104 are therefore associated one with the other through some form of LAN or the like, in which effective communication may be established through electrically conductive connections, through fiber optical links, through infrared or other radiation links, or in other manners. A "network" may include any type of data communications channel, such as an Ethernet network, token ring, X.10, X.25, etc. Those skilled in the art will recognize that the invention described herein may be implemented utilizing any type of data communications channel.

Figure 2:
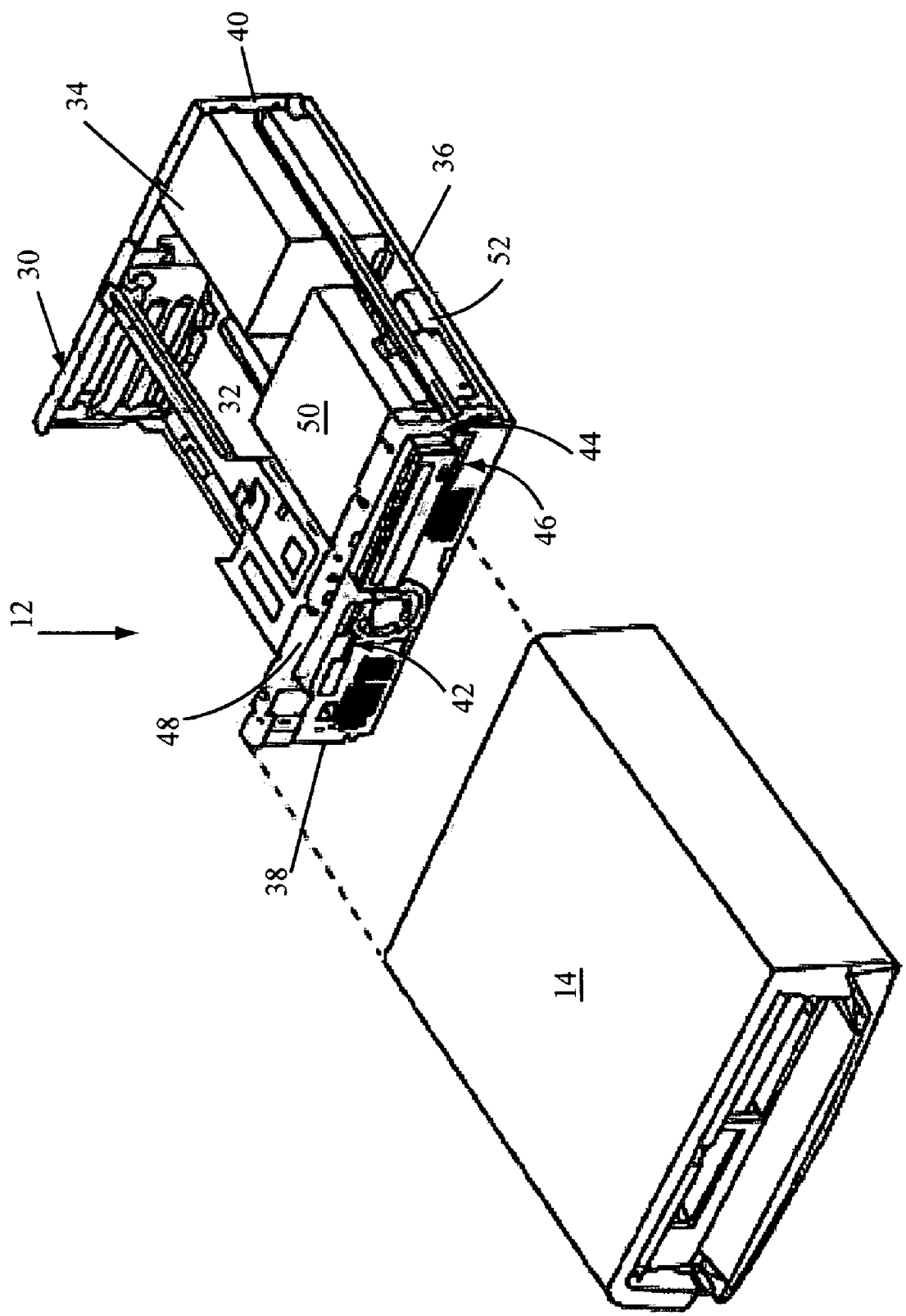
FIG. 2 depicts an exploded perspective view of certain elements of a personal computer according to one embodiment, including a chassis, a cover, and a planar board.
Figure 3:
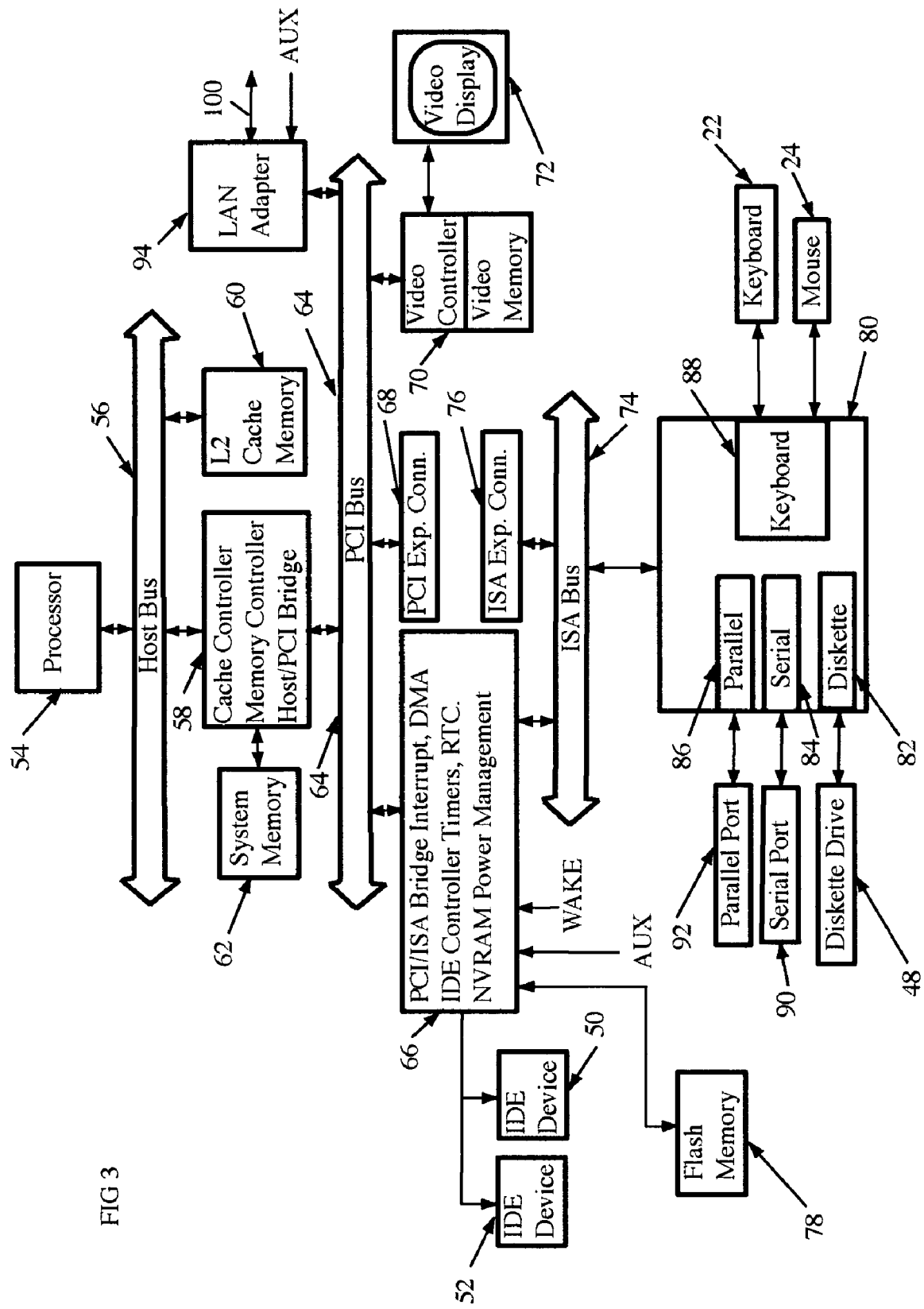
FIG. 3 depicts a block diagram of certain components of the personal computer of FIG. 2.

FIGS. 2 and 3 depict one embodiment of a personal computer 12 suitable for use as, for example, a client 104. In one embodiment, server 102 may also be a personal computer 12. Alternatively, the server 102 may be some computer having capabilities other than those ascribed herein to a "personal computer", and possibly beyond those capabilities.

As shown in FIG. 2, personal computer 12 comprises a cover 14 which is a decorative outer member which cooperates with a chassis 30 in defining an enclosed, shielded volume for receiving electrically powered data processing and storage components for processing and storing digital data. At least certain of these components are mounted on a multilayer planar 32 or motherboard which is mounted on the chassis 30 and provides a means for electrically interconnecting the components of the personal computer 12 including those identified above and such other associated elements as floppy disk drives, various forms of direct access storage devices, accessory adapter cards or boards, and the like. As pointed out more fully hereinafter, provisions are made in the planar 32 for the passage of input/output signals to and from the operating components of the personal computer 12.

Personal computer 12 has a power supply 34, which may be actuated by a power switch (not shown). The chassis 30 has a base indicated at 36, a front panel indicated at 38, and a rear panel indicated at 40. The front panel 38 defines at least one open bay for receiving a data storage device such as a disk drive for magnetic or optical disks, a tape backup drive, or the like. In the illustrated form, a pair of upper bays 42, 44 and a lower bay 46 are provided. One of the upper bays 42 is adapted to receive peripheral drives of a first size (such as those known as 3.5 inch drives) while the other 44 is adapted to receive drives of a different size (such as a CD-ROM or DVD-ROM drive) and the lower bay is adapted to receive another drive. One floppy disk drive indicated at 48 is a removable medium direct access storage device (DASD) capable of receiving a diskette inserted there into and using the diskette to receive, store and deliver data as is generally known. One CD-ROM drive indicated at 50 is a removable medium DASD capable of receiving a compact disc inserted there into and using the disc to deliver data as is generally known. One hard disk drive is indicated at 52 and is a fixed medium DASD capable of storing and delivering data as is generally known.

Referring now to FIG. 3, there is shown a block diagram of a client computer system illustrating the various components of the personal computer of FIG. 2. The components of FIG. 3 comprise components mounted on the planar 32 or other hardware of the personal computer 12. Connected to the planar 32 is the system CPU or processor 54 which is connected directly to a high speed host bus 56. A first system core logic chipset 58 and L2 cache memory 60 are also connected to the host bus 56. The first core logic chipset 58 includes a memory control unit, a L2 cache controller and a peripheral component interconnect (PCI) bridge. The memory control unit is further connected to a volatile random access memory (RAM) 62. The RAM memory 62 is composed of one or more memory modules. The memory control unit, or memory controller, includes the logic for mapping addresses to and from the microprocessor 54 to particular areas of RAM 62. The cache controller is operatively coupled to the L2 cache memory 60.

The first core chipset 58 can be, for example, a Triton VX chip which is sold by Intel Corporation. The PCI bridge within chipset 58 provides an interface between the host bus 56 and a PCI bus 64. Connected to the PCI bus 64 is a second core chipset 66 and a plurality of PCI expansion connectors 68 for receiving PCI bus compatible peripheral cards. One such peripheral card is a video controller 70. The video controller 70 includes video memory and is coupled to the monitor or video display terminal 72. The chipset 66 can be, for example, a PIIX4 chip which is also sold by Intel Corporation.

The chipset 66 contains a bus control and timing unit, a plurality of timers, an interrupt controller, a direct memory access (DMA) unit, nonvolatile CMOS RAM (also herein referred to as NVRAM), a CMOS real-time clock (RTC), Flash memory interface, a PCI/ISA bridge, an integrated drive electronics (IDE) controller, and power management circuitry. The PCI/ISA bridge provides an interface between the PCI bus 64 and an optional feature or expansion bus such as the Industry Standard Architecture (ISA) bus 74. Connected to the ISA bus 74 are a plurality of ISA expansion connectors 76 for receiving ISA adapter cards (not shown). ISA adapter cards can be pluggably connected to the ISA expansion connectors 76 and may provide additional devices or memory for the personal computer 12.

Attached to the chipset 66 is a flash memory (FM) module or chip 78. Flash memory module 78 contains microcode that personal computer 12 will execute on power on. The flash memory 78 is an electrically erasable programmable read only memory (EEPROM) module or chip. The IDE controller provides for the attachment of IDE compatible storage devices such as the fixed disk drive 52 and CD-ROM drive 50.

The real-time clock is used for time of day calculations and the NVRAM is used to store system configuration data. That is, the NVRAM will contain values which describe the present configuration of the personal computer 12. For example, NVRAM 66 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Power management logic within chipset 66 is for changing the personal computer 12 between various power states (e.g., off, suspend and normal operating states). The circuitry is supplied with auxiliary power (AUX) from the power supply 34 (as shown in FIG. 2) when the personal computer 12 is in the off state so that it can monitor events which cause the personal computer 12 to turn on. For example, the circuitry 66 also includes a timer which is configurable by a user to expire after a predetermined period of time. When the timer expires, the circuitry 66 will cause the personal computer 12 to change from the off state to the normal operating state.

Coupled to the ISA bus 74 is a multi-function I/O controller 80 such as, for example, a National Semiconductor PC87307. The I/O controller 80 contains a variety of I/O adapters and other components such as the diskette adapter 82, serial adapter 84, a parallel adapter 86 and keyboard controller 88. The diskette adapter 82 provides the interface to the diskette drive 48. The serial adapter 84 has an external port connector 90 for attachment of external devices such as modems (not shown). The parallel adapter 86 has an external port connector 92 for attachment of external devices such as printers (not shown). The keyboard controller 88 is the interface for the keyboard connector 22 and the mouse connector 24.

A communication subsystem 94 can be coupled to either the PCI bus 64 or ISA bus 74 for allowing personal computer 12 to communicate (i.e., transmit/receive data) with a remote computer or server over a LAN via a connection or link 100. The communication subsystem 94 can be, for example, a LAN adapter or a LAN connection embedded on the planar 32. Communication subsystem 94 may also be known as a network interface card (NIC). Communication subsystem 94 may include a Media Access Controller (MAC), which serves as an interface between a shared data path (e.g., a media independent interface as described below) and the PCI bus 64 (or ISA bus 74 if communication subsystem 94 were connected to the ISA bus 74). The MAC performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception. The MAC can be, for example, an Intel 82557 chip.

The communication subsystem 94 further comprises a physical layer and a media independent interface (MU), which is a local bus between the MAC and the physical layer. The MII is a specification of signals and protocols which formalizes the interfacing of a 10/100 Mbps Ethernet MAC, for example, to the underlying physical layer. The physical layer receives parallel data from the MII local bus and converts it to serial data for transmission over cable 100. The physical layer may be, for example, an Integrated Circuits Systems 1890 chip. The physical layer includes auto-negotiation logic that, in one embodiment, determines the capabilities of the server 102, advertises its own capabilities to the server 102, and establishes a connection with the server 102 using the highest performance common connection technology.

When the communication subsystem 94 is in WOL mode (e.g., when the client 104 is asleep), communication subsystem 94 scans all incoming frames addressed to client 104 for a specific data sequence which indicates that the frame is a WOL or magic packet frame. WOL packets and frames are described in more detail in relation to FIGS. 4 and 5. If the communication subsystem 94 scans a frame and does not find the appropriate WOL sequence, it discards the frame and takes no further action. If it detects the WOL sequence, however, it then alerts the power management circuitry 66 to wake up or power on the system.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. As one example, the system processor 54 could be an Intel Pentium processor, Cyrix 586-P75 processor or Advanced Micro Devices 8486 processor or any other suitable microprocessor.

Figure 4:
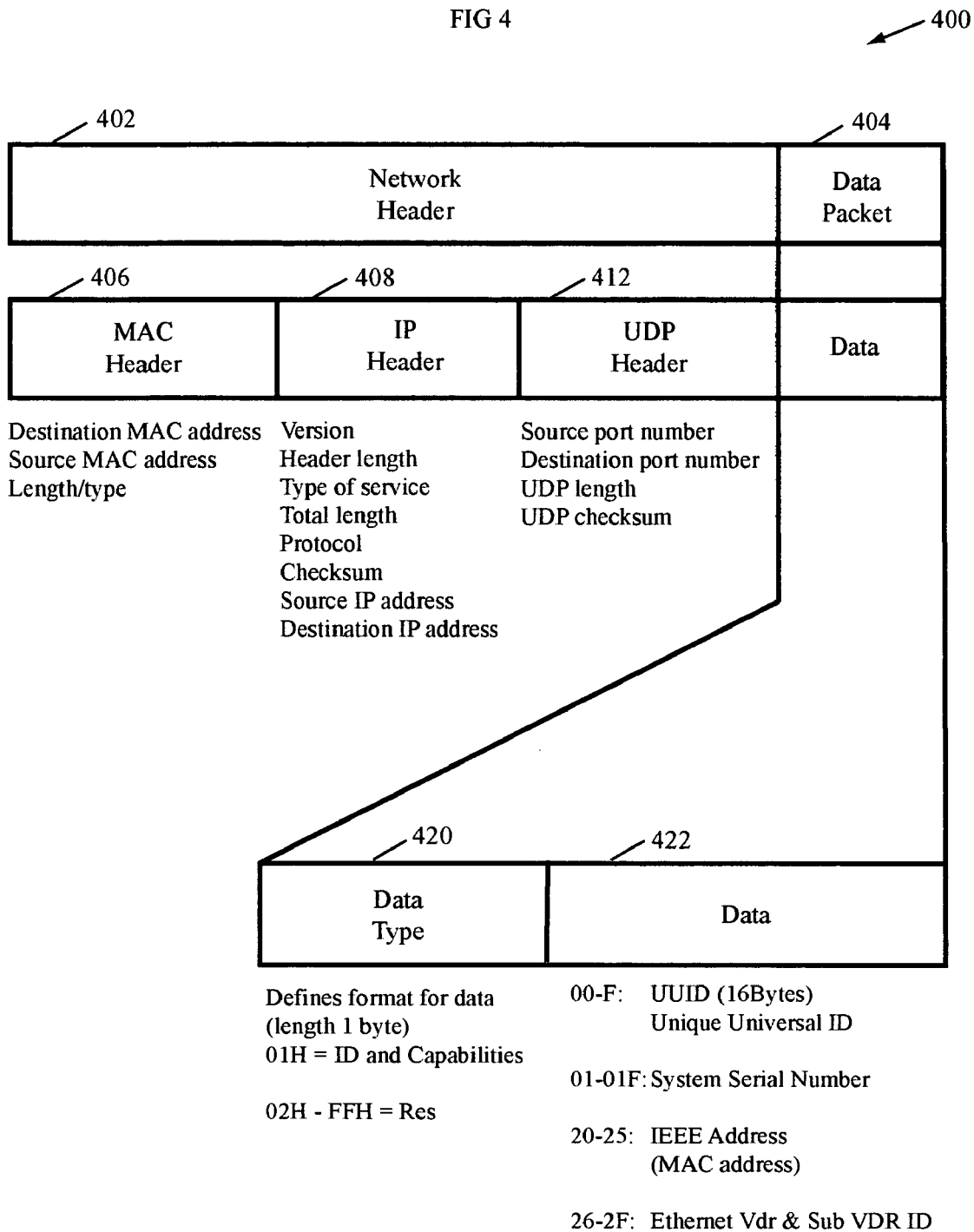
FIG. 4 depicts a diagrammatic representation of a network packet which is sent by a personal computer according to one embodiment.

FIG. 4 depicts a diagrammatic representation of a network packet which is sent by a personal computer 12 or server 102 according to one embodiment. The network packet 400 comprises a network header 402 and data packet 404 that can be sent over a network, such as an Ethernet network. Network header 402 includes a MAC header 406, IP header 408, and UDP header 412 which are all known in the art to provide addresses, identifiers, and other information for assuring correct transfer of the packet 400. Data packet 404 includes the information content to be transferred.

The data packet 404 comprises a data type 420 which is first used to set up a category of data and a data portion 422, which provides specific information. The data type 420 indicates a transmission of system identification and capabilities. The data patterns defined are the (1) Universal Unique ID (UUID) which is used by server 102 to reference personal computer 12, (2) serial number of personal computer 12 which is used by server 102 to determine the model of personal computer 12, (3) IEEE Address which is assigned by IEEE to uniquely identify personal computer 12 on a network, and (4) Ethernet Vendor which identifies the vendor of the communication (Ethernet LAN) subsystem 94 in personal computer 12 used by the server 102 to select the correct device driver. It should be understood that the data packet 404 and data patterns shown in FIG. 4 are by way of example only, and other packets and patterns can be used with the present invention.

Figure 5:
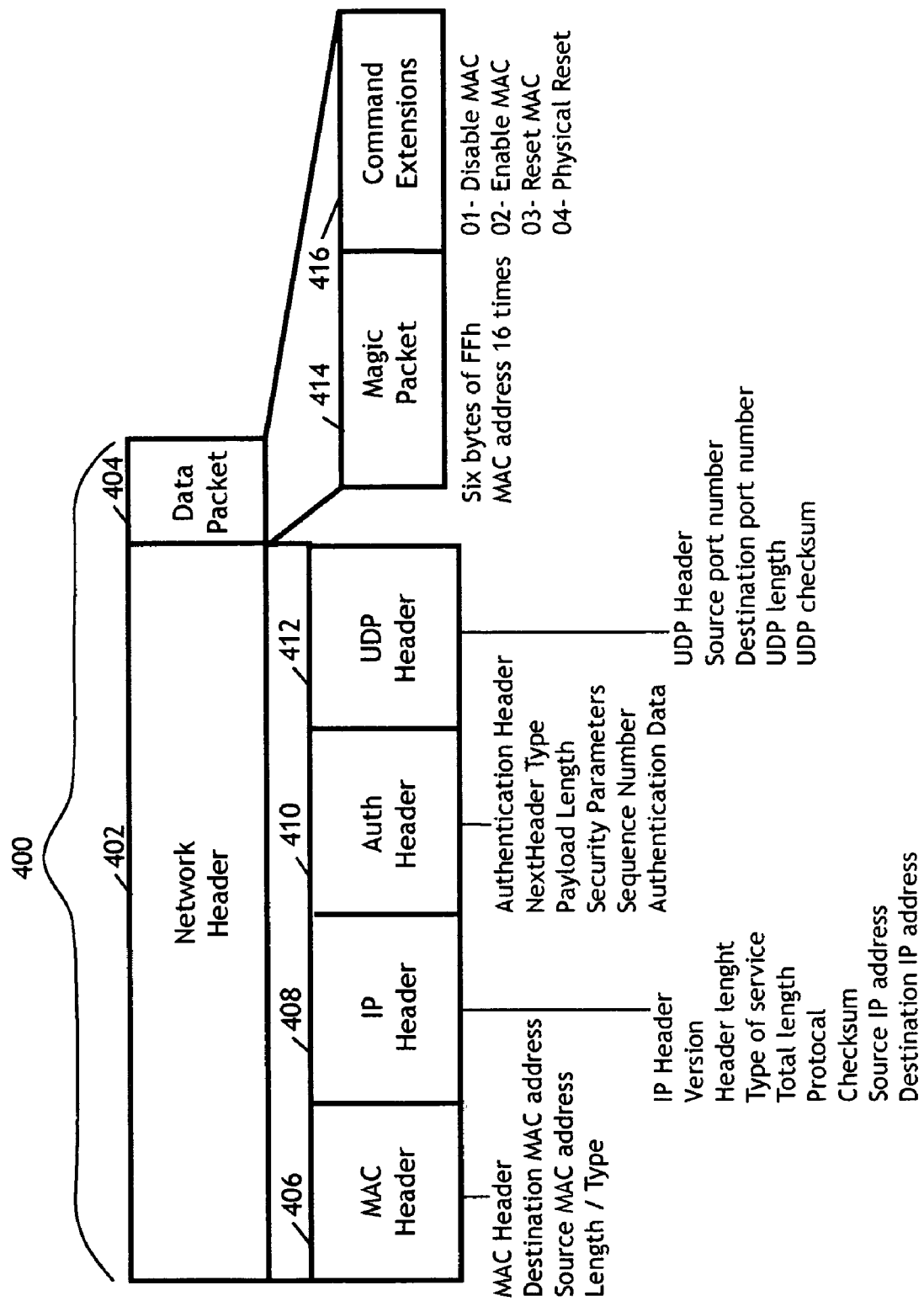
FIG. 5 depicts a diagrammatic representation of a network packet which is sent by a personal computer according to one preferred embodiment.

As one example of another packet, a type of data packet 404 called a "magic packet" is depicted in FIG. 5. In FIG. 5, data packet 404 comprises a magic packet frame 414 and command extensions 416. Magic packet 414 comprises the source address (server 102 MAC address), destination address (e.g., a client 104 MAC address or a multi-cast address for a broadcast magic packet), and a synchronization stream. The synchronization stream is typically six (6) bytes of FFh and is used to help client 104, particularly communication subsystem 94, recognize a frame as a magic packet frame 414. A delineator such as six bytes of FFh is easy for hardware to detect and identifies the information as a magic packet 414. In the embodiment depicted in FIG. 5, the content of magic packet 414 is a six bytes of "FF" followed by 16 copies of MAC addresses (with, for example, 8 copies of server MAC address and 8 copies of client MAC address) with no breaks or interruptions. In one alternative embodiment, there are 12 copies of MAC addresses, where 6 copies are client MAC addresses and 6 copies are server MAC addresses. The MAC addresses may be located anywhere within the data packet 404 but are preferably preceded by a synchronization stream. Client 104 will, in one embodiment, confirm that the magic packet 104 contains the proper (and proper number of) synchronization stream, server MAC address, and client MAC address before initiating the power on process.

In an alternative embodiment, a broadcast magic packet 414 may be used. In this embodiment, the magic packet 414 is intended to be received by all clients 104 on the network and the destination MAC address is listed as, for example, all ones (1's). This will indicate to client 104 that the magic packet 414 is intended for it, even though the client MAC address is not included. In another embodiment, a multicast broadcast to a specified group of clients 104 may be utilized.

Data packet 404 also may include command extensions 416. Server 102 may specify one of a plurality of command extensions in data packet 404 in order to modify the network activity of client 104 in a particular way.

When a network packet 400 is received by client 104, it is received by physical layer and placed on the MII bus. When network packet 400 comprises a Magic packet 414 (as shown in FIG. 5), the MAC detects that it includes Magic packet 414, and then MAC ignores any command extensions 416.

Figure 6:
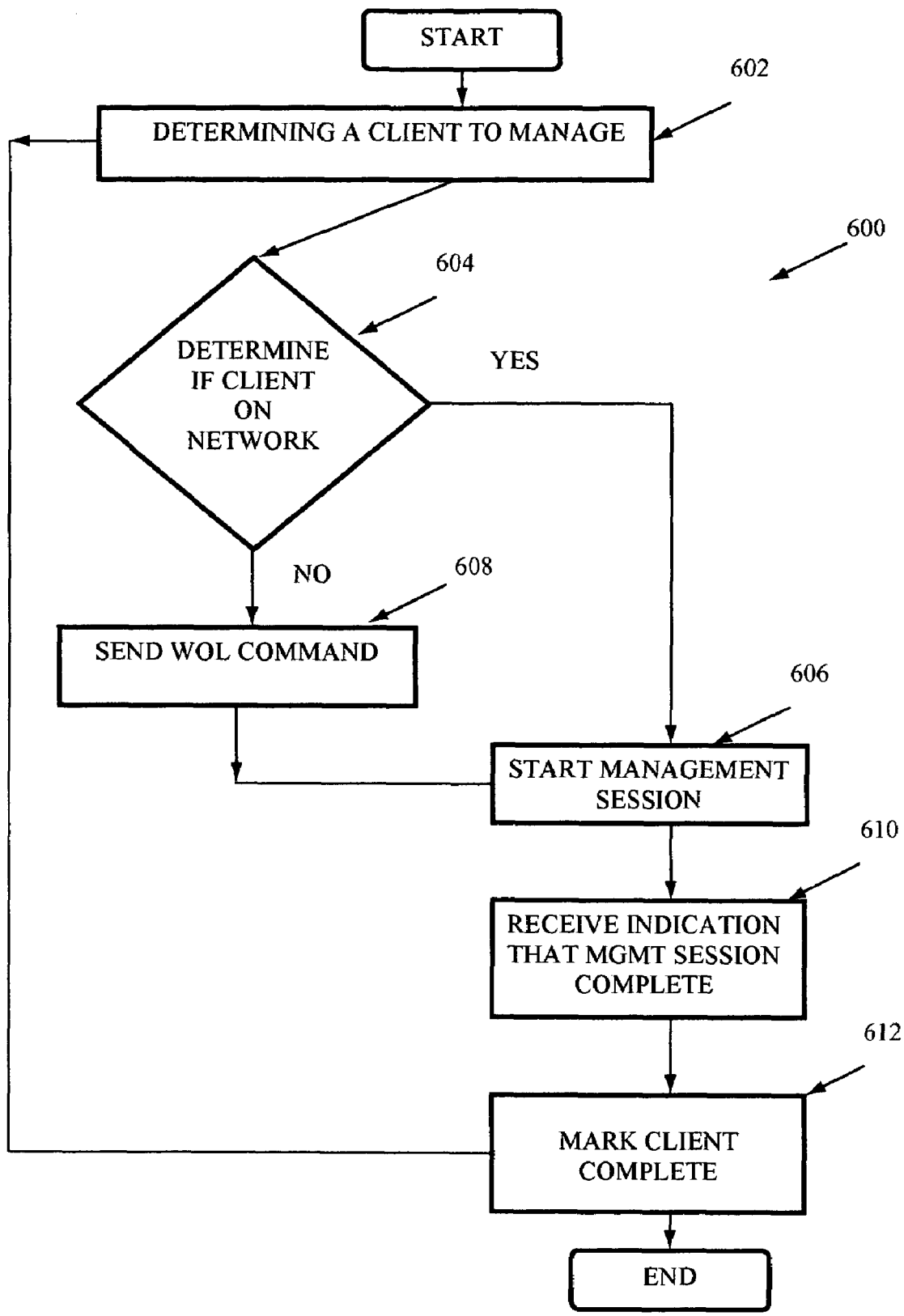
FIG. 6 depicts a flowchart for waking-up and managing a client according to one embodiment.

Referring now to FIG. 6, there is shown an example of a flow chart 600 for a method for managing one or more clients, where one or more clients are asleep. In one embodiment, the method of flow chart 600 is performed on a server 102. Flow chart 600 begins with element 602, determining a client 104 to manage. In element 602, a client 104 may be chosen from a list of clients 104 via any methodology, such as by geographical location, time zone, user work schedules, type of computer, type of software, version of software loaded, need for updated software, specified desire for updated software, user-defined order, etc.

Managing a client 104 may include transmitting software, data, or updates to a client 104, receiving data or information from a client 104, requesting the client 104 to perform certain tasks or execute particular programs, etc. In one embodiment, managing a plurality of clients 104 is desired. To manage clients 104 efficiently, a server 102 may command, for example, that a new version of software be downloaded to clients 104 overnight so as to minimize any impact on users or the network during business hours. As another example, a server 102 may desire to access a database stored on a plurality of clients 104. As described herein, management of clients 104 may include any transmission, access or receipt of data or instructions between a client 104 and a server 102. A server 102 may handle a plurality of clients in any sort of order, such as by need, by geographical location, based on network loadings, based on the WOL status of the clients 104, by pre-defined group, importance, in groups or simultaneously, by random selection, etc.

After determining a client to manage, the function continues to decision block 604, determining if selected client 104 is on the network. Any method of determining if a client 104 is one the network may be used. If the client 104 is determined to be on the network, a management session for the client 104 is started in element 606. The management session may include downloading data or software to the client 104, causing certain programs to execute on the client 104, receiving data from the client 104, any interaction between the server 102 and client 104, etc. If the client 104 is determined (by, for example, the server 102) to not be on the network, the function continues to element 608, sending a WOL command. As described previously in relation to FIG. 5, the WOL command may be contained within a network packet, such as a Magic packet 414, which is transmitted over a network to a client 104. As described previously, the WOL command will instruct the communication subsystem 94 to "wake" the client 104 so that a management session can be accomplished. After waiting an appropriate time (e.g., waiting for the system to boot up), the function continues to element 606, starting the management session for the client 104. After the management session is started, the function continues to optional element 610, receiving an indication that the management session is complete. An indication that a management session is complete may be useful in scheduling network activity, managing the current status of clients 104, etc. The management session is marked complete in element 612 and the function returns to element 602, where the next client 104 is determined, or the function terminates.

One problem with the method of FIG. 6 is that clients 104 that cannot handle the WOL command are not known to the server 102. From the server's 102 point of view, it only knows that a client 104 is not active on the network. A client 104 may, for example, be physically removed from a network (e.g., laptop computer on travel), asleep with WOL enabled and awaiting a command, asleep with WOL disabled, hung up and unable to respond, etc. Unless the client 104 is asleep and awaiting a WOL command, the transmission of Wake-on-LAN commands in element 608 is a wasted effort. Similarly, if a WOL command is issued to a client 104 and the client is not detected on the network after a period of time, the server 102 does not know what is causing the problem. Because the server 102 does not know the problem, solving the problem is made much more difficult. For example, if a server 102 knew that WOL was disabled on a client 104 and a critical file needed to be downloaded to client 104 (or a critical file needed to be retrieved), the server 102 could intentionally override the WOL disabled status and force the WOL functionality to be enabled, allowing wake-up of the client.

Figure 7:
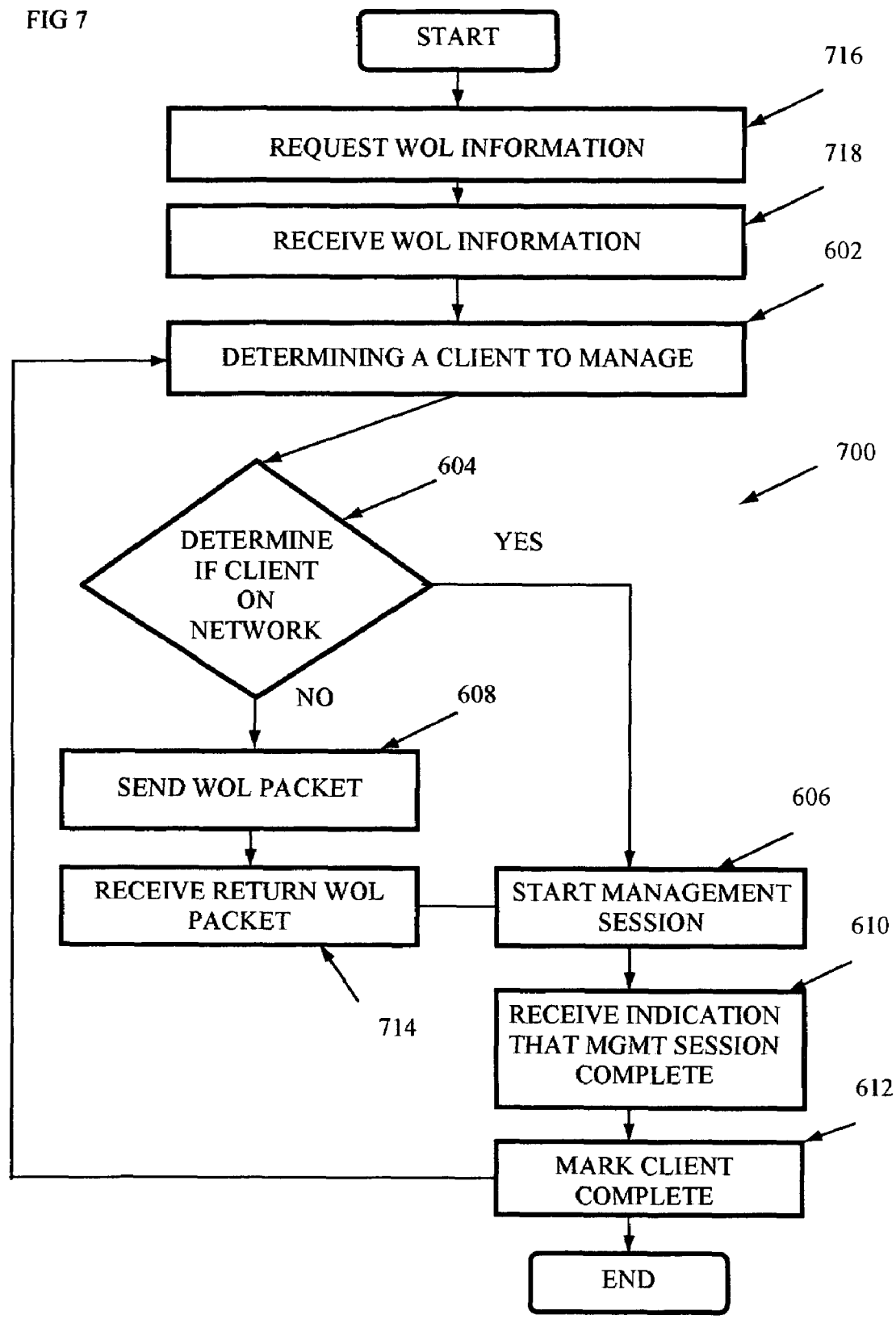
FIG. 7 depicts a flowchart for waking-up and managing a client according to a second embodiment.

FIG. 7 depicts an improved method for managing one or more clients according to one embodiment. Function 700 adds additional functionality to function 600 of FIG. 6, providing for receipt of WOL information from clients by a server. Function 700 begins with optional elements 716 and 718, requesting and receiving WOL information from a client 104. In one embodiment, the WOL information is a return WOL packet containing information about whether a WOL operation was successfully performed. WOL operations may include waking-up using WOL, "sleeping" using WOL, enabling WOL, disabling WOL, etc. Thus, in one example, server 102 could receive a return WOL packet that indicated that WOL had been disabled for a particular client 104.

The return WOL packet is a feedback mechanism that provides information to the server 102 as to the success or current status of a WOL operation. For example, the return WOL packet may contain an indication that the communication subsystem 94, and thus WOL functionality, is disabled, present and enabled, inoperable, or not present. The return WOL packet is described in more detail in relation to FIG. 9.

In element 716, a server 102 may transmit a request for WOL information to an individual client 104, group of clients 104, or all clients 104. Responses from one or more clients 104 are then received in element 718. If a client 104 does not respond, it may be considered to be disabled (such as an inoperative communication subsystem 94). By utilizing optional elements 716 and 718, a server 102 may determine the current WOL configuration of its clients 104 so as to efficiently manage any operations on the clients 104. Alternatively, server 102 may obtain client WOL information when WOL operations are performed, as described subsequently.

Function 700 continues with element 602, determining a client to manage. In element 602, a client 104 may be chosen from a list of clients 104 via any methodology, as described in relation to FIG. 6. Additionally, server 102 may choose a client 104 based on WOL information that may have been received in element 716. In one example, only clients 104 that have WOL enabled and are currently asleep might be selected in element 602. In another example, only clients 104 in need of a particular management session (e.g., downloading a new operating system patch) might be chosen.

After determining a client to manage, the function continues to decision block 604, determining if selected client 104 is on the network. If the client 104 is determined to be on the network, a management session for the client 104 is started in element 606. If the client 104 is determined to not be on the network, the function continues to element 608, sending a WOL command in a WOL packet. In element 714, receiving return WOL packet, the server receives a return WOL packet from the client 104. The return WOL packet will include information about whether the operation requested in the WOL command was successfully performed. After receiving the return WOL packet, the function continues to element 606, starting the management session for the client 104. After the management session is started, the function continues to optional element 610, receiving an indication that the management session is complete. The management session is marked complete in element 612 and the function returns to element 602, where the next client 104 is determined. Updated WOL information associated with a client (e.g., WOL enabled, etc.) may also be saved in element 612, as described more fully in relation to FIG. 8. The function then either terminates or returns to element 602 to determine a new client 104 for which to initiate a management session.

In an alternative embodiment, after receiving an indication in a return WOL packet that WOL has been disabled, server 102 may transmit an override command to enable WOL functionality before the management session is started. The override command could be sent as part of a magic packet or otherwise. This would allow a server 102 to wake up a client 104 that had WOL disabled for particularly critical needs (such as downloading a critical patch to counter a virus).

In another alternative embodiment, the WOL command is sent via a broadcast message. In this embodiment, particular clients 104 are not identified, and a special code or other indication may be used instead of client MAC addresses to indicate that the broadcast message is meant for a group of clients 104.

FIG. 8 depicts a database table according to one embodiment. Table 800 may be used by a server 102 to manage clients 104 and may, in one embodiment, be located on a WOL database server 110 as shown in FIG. 1. In one embodiment, table 800 includes a client identification column 802, a network status column 804, a WOL status column 806, a client management column 808, and an update status column 810. Client identification column 802 may contain an identification associated with a particular client 104, such as a numerical identification, MAC code, network ID, etc. Network status column 804 may provide an indication of whether a client 104 is on the network (e.g., can be located and identified on the network). WOL status column 806 may contain an indication of whether WOL is either enabled or disabled for a particular client 104. Client management column 808 may contain an indication of whether the client 104 may be managed. This indication may be based on a determination of whether WOL is enabled, installed, or operational, or whether the client 104 itself is on the network or otherwise available, etc. Update status column 804 may include information about whether an update is needed, has already been started, has been completed, etc. Any of these tasks may be considered management sessions. In an alternative embodiment, update status column 804 may include any indication of an operation (or operations) to be performed on or related to a client 104. Any other type of database or organizational structure may be used in place of table 800.

FIG. 9 depicts a method of receiving a WOL packet and creating a return WOL packet according to one embodiment. In this embodiment, function 900 may be performed on a client 104 in communication with a server 102 performing function 700 of FIG. 7. Function 900 begins with element 702, waiting for WOL packet. In one embodiment, client 104 will be waiting in a low power state to receive the WOL packet. In element 904, client 104 receives the WOL packet from the server 102. The function continues in element 906, creating return WOL packet. The WOL status (enabled or disabled) is added to the return WOL packet in one embodiment. After the return WOL packet is created, it is transmitted to the server 102 in element 908.

The return WOL packet is primarily a feedback mechanism that provides information to the server 102 as to the success or current status of a WOL operation. For example, the return WOL packet may contain an indication that the communication subsystem 94, and thus WOL functionality, is disabled, present and enabled, inoperable, or not present. In one embodiment, the return WOL packet is created by making a modification to the WOL or magic packet 414 received from the server 102. For example, one of the bytes of MAC address (either client or server) may be replaced by a status packet indicating the WOL status of the client. As one example, after a client successfully initializes after a WOL command, the client 104 could create a return WOL packet where one byte included an indication that the WOL was enabled and the client was awake.

For example, a return WOL packet could include a synchronization stream, six copies of the server address, five copies of the client address, and an indication of the WOL status of the client. Alternatively, there could be five copies of the server address and six copies of the client address. The server 102 could be configured to be seeking any type of content in the return WOL packet.

In another alternative embodiment, a modification could be made to another byte, such as part of the synchronization stream, such as by reducing the number of FFh bytes. In yet another alternative embodiment, the return WOL packet may be created independently from the original magic packet 414. In this embodiment, an indication of the server and client addresses, particularly the client address, may still be useful.

Function 900 continues to decision block 910, where the function determines if WOL is enabled. If WOL is enabled, the function continues to element 912, issue power on command and the function then terminates. In this element, a power on command is issued to the appropriate software and/or hardware of client 104 to wake-up client 104. If WOL is not enabled, the function continues to element 902, waiting for WOL packet. The steps of function 900 may be in different orders. In one alternative embodiment, the return WOL packet may not be transmitted until after decision block 910.

One embodiment of the invention is implemented as a program product for use with a computer system such as, for example, the system 101 shown in FIG. 1. The program product could be used on a server 102, on a client 104, or any combination thereof, or on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing one or more client computer systems, where one or more clients may be asleep. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing a remote client on a network, the method comprising:

transmitting a request for wake-on-LAN status information to a plurality of clients;

receiving a response from one or more of the clients, the response including an indication of wake-on-LAN functionality status of the client;

updating the status of the wake-on-LAN functionality of the responding clients in a database;

determining one or more clients to be managed from the plurality of clients based on the received statuses of wake-on-LAN functionality by only determining that a particular client should be managed in response to receiving a response from the particular client that the particular client's wake-on-LAN functionality status is active;

determining one or more clients not to be managed from the plurality of clients by determining that a particular client should not be managed in response to not receiving a response from the particular client that the particular client's wake-on-LAN functionality is active;

in response to receiving responses from the one or more clients and determining one or more clients to be managed, transmitting a first network packet only to the determined one or more clients to be managed using the network and not to the one or more clients determined not to be managed, the first network packet comprising a wake-on-LAN packet; and receiving, from each of the determined one or more clients to be managed, a return wake-on-LAN packet, the return wake-on-LAN packet comprising an indication of the address of the client to be managed and an indication of the status of the wake-on-LAN functionality of the client to be managed.

2. The method of claim 1, further comprising transmitting a command to start a management session on the one or more clients to be managed using the network.

3. The method of claim 2, further comprising:

receiving an indication from a determined client that, the client's wake-on-LAN functionality is disabled; and transmitting an override command to the determined client with wake-on-LAN functionality disabled.

4. The method of claim 1, further comprising:

receiving an indication that the management session is complete; and marking the one or more clients to be managed in a database as having completed its management session.

5. The method of claim 1, wherein the wake-on-LAN packet comprises an indication of the client address.

6. The method of claim 1, wherein the wake-on-LAN packet comprises an indication of a broadcast wake-on-LAN command.

7. The method of claim 1, wherein the wake-on-LAN packet comprises an indication of an address for the transmitting computer.

8. The method of claim 1, wherein at least one response from a client to the request for wake-on-LAN information comprises an indication that the client has wake-on-LAN enabled.

9. The method of claim 1, wherein at least one response from a client to the request for wake-on-LAN information comprises an indication that the client has wake-on-LAN disabled.

10. The method of claim 1, wherein the network is an Ethernet network.

11. A data processing system for managing a remote client on a network, the system comprising:

a server computer system in communication with at a plurality of client computer systems, the server computer system comprising a processor capable of determining whether the client computer system is active;

wherein the server computer system transmits requests for wake-on-LAN status information to a plurality of clients and receives responses from one or more of the clients that include an indication of wake-on-LAN functionality status of the client;

wherein the server computer system determines one or more clients to be managed from the plurality of clients based on the received statuses of wake-on-LAN functionality by only determining that a particular client should be managed in response to receiving a response from the particular client that the particular client's wake-on-LAN functionality status is active and by determining that a particular client should not be managed in response to not receiving a response from the particular client that the particular client's wake-on-LAN functionality is active;

wherein the server computer system transmits a first network packet only to each of the clients determined to be managed, the first network packet comprising a wake-on-LAN packet;

wherein the server computer system receives a return wake-on-LAN packet from each of the clients determined to be managed, the return wake-on-LAN packet comprising an indication of the address of the client and an indication of the status of the wake-on-LAN functionality of the client; and a database, the database comprising an indication of one or more clients and the status of their wake-on-LAN functionality.

12. The system of claim 11, wherein the network comprises an Ethernet network coupled to the server computer system and the at least one client computer system.

13. The system of claim 11, further comprising a plurality of client computer systems, the plurality of client computer systems being capable of creating a return wake-on-LAN packet.

14. A computer storage medium containing instructions effective, when executing in a data processing system, to cause said data processing system to perform operations comprising:

transmitting a request for wake-on-LAN status information to a plurality of clients;

receiving a response from one or more of the clients, the response including an indication of wake-on-LAN functionality status of the client;

updating the status of the wake-on-LAN functionality of the responding clients in a database;

determining one or more clients to be managed from the plurality of clients based on the received statuses of wake-on-LAN functionality by only determining that a particular client should be managed in response to receiving a response from the particular client that the particular client's wake-on-LAN functionality status is active;

determining one or more clients not to be managed from the plurality of clients by determining that a particular client should not be managed in response to not receiving a response from the particular client that the particular client's wake-on-LAN functionality is active;

in response to receiving responses from the one or more clients and determining one or more clients to be managed, transmitting a first network packet only to the determined one or more clients to be managed using the network and not to the one or more clients determined not to be managed, the first network packet comprising a wake-on-LAN packet; and receiving, from each of the determined one or more clients to be managed, a return wake-on-LAN packet, the return wake-on-LAN packet comprising an indication of the address of the client to be managed and an indication of the status of the wake-on-LAN functionality of the client to be managed.

15. The computer storage medium of claim 14 wherein the operations further comprise transmitting a command to start a management session on the one or more clients to be managed using the network.

16. The computer storage medium of claim 14 wherein the operations further comprise:

receiving an indication from a determined client that the client's wake-on-LAN functionality is disabled; and transmitting an override command to the determined client with wake-on-LAN functionality disabled.

* * * * *